United States Patent
Hucker (12)

(10) Patent No.: US 11,563,390 B2
(45) Date of Patent: Jan. 24, 2023

(54) BRAKING DEVICE FOR A MOVABLE DOOR LEAF AND DOOR CLOSER HAVING SUCH A BRAKING DEVICE

(71) Applicant: Geze GmbH, Leonberg (DE)

(72) Inventor: Matthias Hucker, Marxzell (DE)

(73) Assignee: GEZE GMBH, Leonberg (DE)

( * ) Notice: Subject to any disclaimer, the term of this patent is extended or adjusted under 35 U.S.C. 154(b) by 1029 days.

(21) Appl. No.: 16/242,933

(22) Filed: Jan. 8, 2019

(65) Prior Publication Data

US 2019/0218842 A1 Jul. 18, 2019

(30) Foreign Application Priority Data

Jan. 17, 2018 (DE) .......................... 102018200700.4

(51) Int. Cl.
*H02P 3/00* (2006.01)
*H02P 3/16* (2006.01)
*H02P 3/14* (2006.01)

(52) U.S. Cl.
CPC . *H02P 3/16* (2013.01); *H02P 3/14* (2013.01)

(58) Field of Classification Search
CPC ........... E05F 5/027; E05F 15/611; E05F 3/02; E05Y 2900/132; E05Y 2201/434; E05Y 2400/302; E05Y 2400/616; H02P 3/14; H02P 3/16
See application file for complete search history.

(56) References Cited

U.S. PATENT DOCUMENTS

| 5,243,735 A | * | 9/1993 | O'Brien, II ........... E05F 15/611 74/89.17 |
| 5,687,507 A | * | 11/1997 | Beran ..................... E05F 15/63 74/89.37 |
| 7,571,515 B2 | * | 8/2009 | Fischbach ............... E05F 15/42 49/342 |
| 2009/0093913 A1 | * | 4/2009 | Copeland, II ............. E05F 3/18 700/297 |

FOREIGN PATENT DOCUMENTS

DE 102015200284 B3 * 10/2015 ............. E05F 15/63

* cited by examiner

*Primary Examiner* — Julio C. Gonzalez
(74) *Attorney, Agent, or Firm* — Dennemeyer & Associates, LLC (57) ABSTRACT

A braking device for a movable door leaf according to the invention comprises at least one generator, at the output terminals of which, a generator voltage can be generated, by means of which a charging circuit for supplying an open-loop and/or closed-loop control unit may be charged, by means of which an electric braking device, such as, in particular, a braking motor or the like, is controllable, which generates an effective braking force for damping the movement of the door leafs. Therein, the generator shaft of the generator is rotatable for generating the generator voltage with the discharging of a mechanical generator energy storage specifically associated with the generator, which is charged by a respective opening or closing movement of the door, and, during a respective closing or opening movement of the door, is mechanically decoupled from the same or its axis of rotation, and discharges in the state mechanically decoupled from the door leaf or its axis of rotation. Further specified is a door closer, having a rotatable door closer axis, coupleable with a door leaf, cooperating with a mechanical door closer energy storage device, and a correspondingly designed braking device.

12 Claims, 4 Drawing Sheets

BRAKING DEVICE FOR A MOVABLE DOOR LEAF AND DOOR CLOSER HAVING SUCH A BRAKING DEVICE

CROSS-REFERENCE TO RELATED APPLICATIONS

This application claims priority to German application DE 102018200700.4, filed Jan. 17, 2018, which is hereby incorporated by reference in its entirety.

The invention relates to a braking device for a movable door leaf, having at least one generator, at the output terminals of which a generator voltage can be generated, by means of which a charging circuit for supplying an open-loop and/or closed-loop control unit may be charged, by means of which an electric braking device, such as, in particular, a braking motor or the like, is controllable, which generates an effective braking force for damping the movement of the door leaf. It further relates to a door closer, having a rotatable door closer axis, coupleable with a door leaf, cooperating with a mechanical door closer energy storage device, and such a braking device.

A braking device of the above-mentioned type is known, for example, from DE 10 2016 202 225. The autonomous braking device in question has a generator, the generator shaft of which is fixedly coupled with the door leaf or its axis of rotation, respectively, and thus is rotatable directly by a respective movement of the door leaf, so that an output voltage is generated at its terminals, dependent on the respective movement of the door leaf, that is applied to the charging circuit to supply an evaluation and control unit with electrical energy, by means of which the braking motor is controllable.

It is true that such generative damping achieves improved adjustability of the closing speed of the door leaf within certain limits, compared to a conventional hydraulically damped door closer, in which the closing speed of the door by means of the hydraulic valves is adjustable only within limits. Since in such a known braking device, the generator shaft is fixedly connected to the axis of rotation of the door leaf by means of a gear unit and other fittings, such as a sliding rail with lever or a linkage, the generated generator voltage is always proportional to the speed of the door leaf. However, the speed of the door leaf can vary within a wide range. If the door leaf is manually opened very quickly, possible opening times, starting from an opening angle of 0° up to an opening angle of 90°, may be, for example, 1 second. If the braking device dampens the closing movement of the door leaf very strongly by means of the mechanical energy storage device of the door closer concerned, which generally comprises a spring unit, achievable closing times, from an opening angle of 90° to an opening angle of 0°, may be, for example, up to 90 seconds.

If, for example, the generator is designed such that voltage values in a range of up to 2V are applied to the terminals of the generator for a closing time of 90 seconds, voltage values of up to 180V are applied to these terminals of the generator for an opening time of, for example, 1 second. The consequence is, however, that the charging circuit must be designed for such a large voltage range. Another disadvantage of the fixed connection of the generator shaft with the axis of rotation of the door leaf is the dependence of the polarity of the generator voltage on the direction of rotation of the door leaf. For example, it depends on whether the door concerned is a DIN left or a DIN right door or whether the door is opening or closing.

If, for example, a DC motor with brushes, supplying a DC voltage, is used as the braking motor, a rectifier must be installed in the charging circuit due to this dependence of the polarity of the generator voltage on the direction of rotation of the door leaf. However, the consequence is that, for slow closing speeds, there is already a 1.2V drop of the generator voltage of 2V at the two diodes of the rectifier. The generator winding must be designed accordingly.

Door closers for movable door leafs with a mechanical energy storage device are also generally known. When a door leaf is opened manually, the mechanical energy storage device is loaded with potential energy, which closes the door leaf again when released. The mechanical energy storage device comprises, for example, a spring unit, which is tensioned by manually opening the door leaf. The potential energy in the spring unit subsequently closes the door leaf. The closing moment of the door leaf is determined by the current spring tension and the various gear ratios in the system and can be affected by, for example, a braking motor, as described.

The object of the invention is to propose a braking device as well as a door closer of the above-mentioned type in which the previously mentioned problems have been eliminated. In the simplest and most cost-effective manner, it is to be achieved, in particular, that the generator provides an at least substantially constant generator voltage, independent of the speed and direction of rotation of the door leaf, and that the charging circuit can be accordingly designed for a smaller voltage range.

This object is achieved according to the invention by a braking device with the features of claim 1 as well as a door closer with the features of claim 14. Preferred embodiments of the braking device according to the invention as well as the door closer according to the invention result from the dependent claims, the present description, and the drawing.

The braking device for a movable door leaf according to the invention comprises at least one generator, at the output terminals of which, a generator voltage can be generated, by means of which a charging circuit for supplying an open-loop and closed-loop control unit may be charged, by means of which an electric braking device, such as, in particular, a braking motor or the like, is controllable, which generates an effective braking force for damping the movement of the door leaf. Herein, in order to generate the generator voltage according to the invention, the generator shaft of the generator is rotatable with the discharging of a mechanical generator energy storage device specifically associated with the generator, which is charged by a respective opening or closing movement of the door leaf and is mechanically decoupled from the door leaf or its axis of rotation during a respective closing or opening movement of the door leaf and discharges in the state mechanically decoupled from the door leaf or its axis of rotation.

The energy for charging the charging circuit is thus still generated by a movement of the door leaf. However, before the generator generates a generator voltage to be applied to the charging circuit, the mechanical generator energy storage device specifically associated with the generator, which is a mechanical energy storage device separate from a mechanical energy storage specifically associated with a respective door closer, is charged by a respective opening or closing movement of the leaf. Only subsequently, the generator shaft of the generator is rotated to generate the generator voltage with the discharging of the mechanical generator energy storage device specifically associated with the generator, wherein the generator energy storage device is mechanically decoupled from the door leaf or its axis of rotation during its discharging. If the mechanical generator energy storage device is charged, for example, during an opening movement of the door leaf, it can be discharged to generate the generator voltage during the closing movement of the door leaf in a state mechanically decoupled from the same or its axis of rotation. If, on the other hand, the mechanical generator energy storage device is charged, for example, during a closing movement of the door leaf, it can be discharged to generate the generator voltage during the opening movement of the door leaf in a state mechanically decoupled from the same or its rotation leaf. The corresponding mechanical decoupling of the generator from the door leaf or its axis of rotation ensures in a relatively simple and correspondingly cost-effective manner that the generator supplies a generator voltage independent of the speed and direction of rotation of the door leaf and the charging circuit can be accordingly designed for a smaller voltage range.

According to an expedient practical embodiment of the braking device according to the invention, during a respective opening or closing movement of the door leaf, by means of which the mechanical generator energy storage device is charged, the mechanical generator energy storage device is mechanically coupled with the door leaf or its axis of rotation by means of a generator driver, which, during a respective closing or opening movement of the door leaf, during which the mechanical generator energy storage device discharges, is mechanically decoupled from the door leaf or its axis of rotation.

It is also particularly advantageous if the generator shaft of the generator is rotatable with a respective discharging of the mechanical generator energy storage device by means of a generator gear unit which is specifically associated with the generator.

The charging circuit may advantageously be associated with a protective diode, which prevents a voltage from being applied to the charging circuit during a respective opening or closing movement of the door leaf, by means of which the mechanical generator energy storage device is charged.

However, according to an expedient embodiment, instead of, or in addition to, such a protective diode, the generator or the generator gear may also be preceded by a one-way overrunning clutch, which prevents a voltage from being applied to the charging circuit during a respective opening or closing movement of the door leaf, by means of which the mechanical generator energy storage device is charged.

If the charging circuit is to be charged during both opening and closing of the door, at least two generators are provided for charging the charging circuit according to another preferred embodiment of the braking device according to the invention, wherein the generator shaft of a first generator is rotatable for generating a generator voltage with the discharging of a first generator energy storage device, specifically associated with this first generator, which is charged by a respective opening movement of the door and is mechanically decoupled from the same or its axis of rotation during a respective closing movement of the door, and discharges in the state mechanically decoupled from the door leaf or its axis of rotation, and the generator shaft of a second generator is rotatable for generating a generator voltage with the discharging of a second generator energy storage device, specifically associated with this second generator, which is charged by a respective closing movement of the door and is mechanically decoupled from the same or its axis of rotation during a respective opening movement of the door, and discharges in the state mechanically decoupled from the door leaf or its axis of rotation.

Expediently, during a respective closing or opening movement of the door leaf, by means of which the first and the second mechanical generator energy storage device are charged, both the first and the second mechanical generator energy storage device may be mechanically coupled with the door leaf or its axis of rotation by means of a first and separate second generator driver, which, during a respective closing or opening or closing movement of the door leaf, during which the respective mechanical generator energy storage device discharges, is mechanically decoupled from the door leaf or its axis of rotation.

It is particularly advantageous if the generator shaft of the first and of the second generator, respectively, is rotatable with the discharging of the first and the second mechanical generator energy storage, respectively, by means of a first or second generator gear unit which is specifically associated with the first and the second generator, respectively.

Between the charging circuit and the first generator and between the charging circuit and the second generator, a protective diode can again be provided, which prevents a voltage from being applied to the charging circuit during a respective opening or closing movement of the door leaf, by means of which the first or second mechanical generator energy storage device, respectively, is charged.

However, alternatively or additionally, the first and second generator or the first and second generator gear unit, respectively, may each again be preceded by a one-way overrunning clutch, which prevents a voltage from being applied to the charging circuit during a respective opening or closing movement of the door leaf, by means of which the first or second mechanical generator energy storage device is charged.

A mechanical generator energy storage device preferably respectively comprises a generator spring unit.

According to a further preferred practical embodiment of the braking device according to the invention, this is designed as a module with a housing, particularly a closed housing, and at least one generator and at least one mechanical generator energy storage device. Advantageously, the module also comprises at least one generator gear unit and/or at least one generator driver.

Optionally, two generators, two mechanical generator energy storage devices and, in particular, two generator gear units and/or two generator drivers may also be provided in the module housing concerned. If two generators are provided, for example, it is also possible, for example, for two separate modules to be provided, which are driven in the opposite direction by means of the door leaf or its axis of rotation or the axis of a door closer associated with the door leaf.

If only one generator module is used, its mounting direction with respect to the axis of rotation of the door leaf or to the axis of a door closer associated therewith is selected depending on the closing direction of the door leaf or door closer, for example by means of a plug-in assembly.

If two generators are used in the same module housing or in separate modules, there is no dependence of the module assembly on the installation of a respective door closer (DIN left/right) and also no dependence on its closing direction.

The door closer according to the invention, having a rotatable door closer axis, coupleable with a door leaf, cooperating with a mechanical door closer energy storage device, and a braking device are characterized in that the braking device is designed in accordance with the braking device according to the invention.

In this case, a door closer driver coupled with the door closer axis preferably cooperates with a respective generator driver such that it entrains the respective generator driver during a respective opening or closing movement of the door leaf by means of which the mechanical generator energy storage device concerned is charged, whereas it is decoupled from the respective generator driver during a respective closing or opening movement of the door leaf, during which the mechanical generator energy storage device concerned discharges.

It is particularly advantageous here if a respective mechanical generator energy storage device is dimensioned smaller than the mechanical door closer energy storage device.

Preferably, a respective generator and the generator gear unit associated therewith are designed so that the discharging of the mechanical generator energy storage device concerned or the relaxing of the generator spring unit concerned is damped at least strongly enough that the generator driver concerned runs behind the door closer driver.

The braking device according to the invention or the door closer according to the invention ensures in a relatively simple and correspondingly inexpensive manner that a respective generator supplies a constant generator voltage, independent of the speed and direction of rotation of the door, for charging the charging circuit so that the charging circuit may correspondingly be designed for a smaller voltage range.

The invention is explained in more detail below on the basis of exemplary embodiments and with reference to the drawings, in which.

Figure 1:
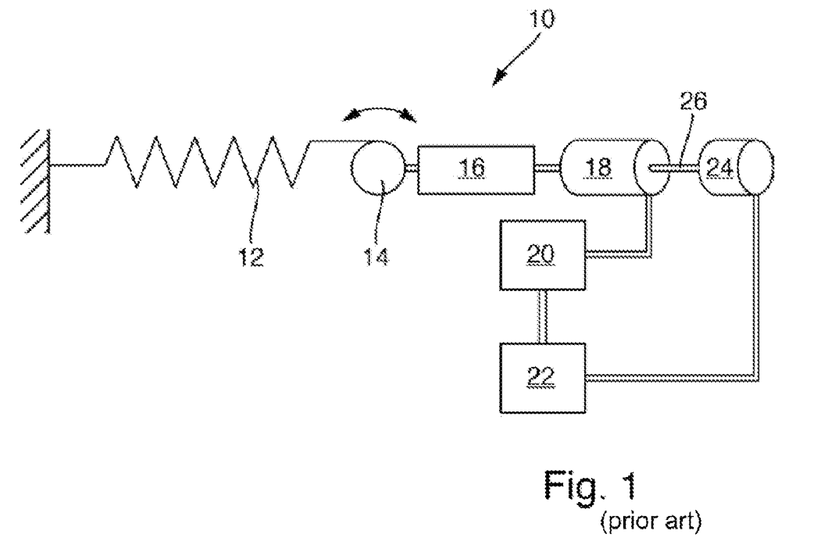
FIG. 1 shows a schematic representation of the fundamental principle of a conventional braking device for generative damping of movement of a door leaf, in which the generator shaft of the generator concerned is permanently, fixedly coupled with the axis of rotation of a door closer and thus permanently, fixedly coupled with the axis of rotation of the door leaf concerned.

FIG. 1 shows a schematic representation of the fundamental principle of a conventional braking device 10 for generative damping of movement of a door leaf. This conventional generative braking device 10 comprises a mechanical door closer energy storage device 12 having, for example, a spring unit, a door closer axis of rotation 14, coupled with the door leaf by means of a fitting of the door leaf, a door closer gear unit 16, a braking motor 18, a regulating and/or control unit 20 for controlling the braking motor 18, a charging circuit 22 for supplying the regulating and/or control unit 20 with electrical energy, and a generator 24 for charging the charging circuit 22.

Figure 2:
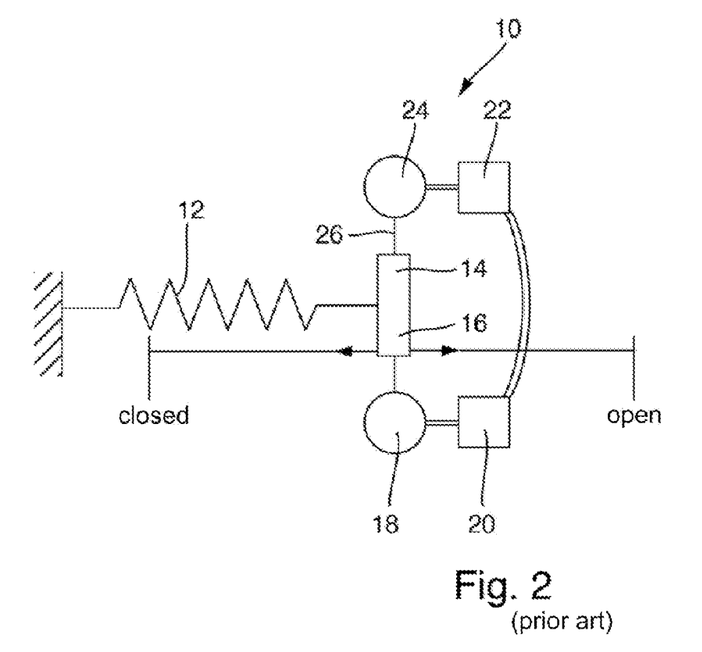
FIG. 2 shows a simplified schematic representation of the conventional generative braking device according to FIG. 1.

In FIG. 2, this conventional generative braking device 10 according to FIG. 1 is shown again in a simplified schematic representation, with like parts being assigned like reference numerals.

In this conventional generative braking device 10, the generator shaft 26 is always fixedly coupled with the door closer axis of rotation 14, and thus always fixedly coupled with the axis of rotation of the door leaf concerned, during both, a respective opening movement as well as during a respective closing movement of the door leaf, which brings along the disadvantages mentioned above.

Figure 3:
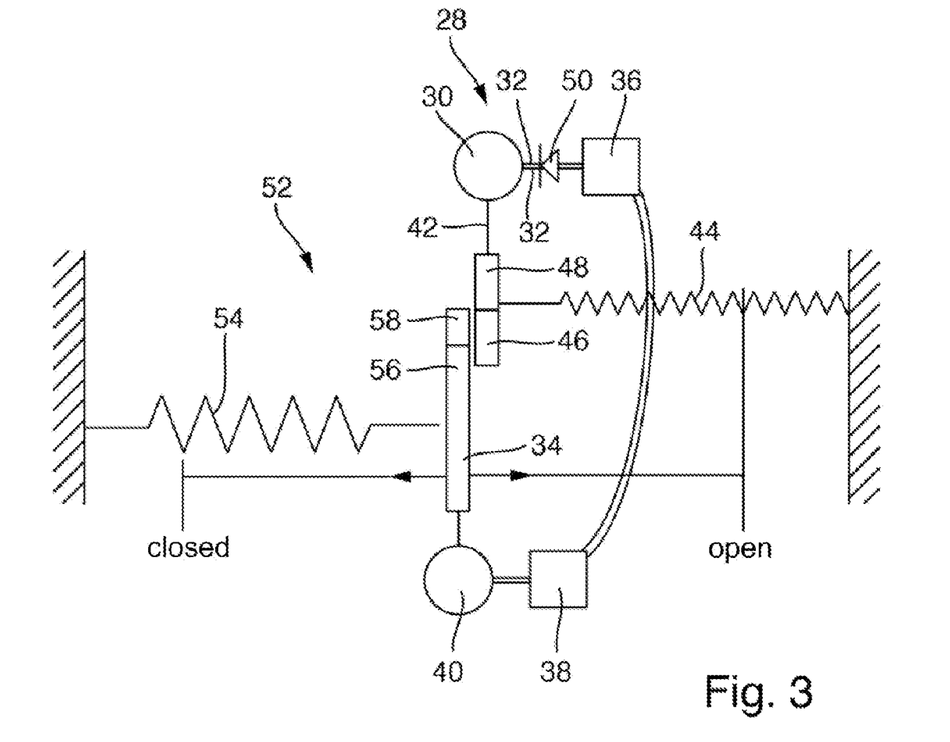
FIG. 3 shows a schematic representation of an exemplary embodiment of a generative braking device according to the invention, having a generator for charging the charging circuit during a respective closing movement of the leaf.

In contrast, FIG. 3 shows a schematic representation of an exemplary embodiment of a generative braking device 28 according to the invention. As can be seen from FIG. 3, this braking device 28 for a movable door leaf comprises a generator 30, at the output terminals 32 of which, a generator voltage can be generated, by means of which a charging circuit 36 for supplying an open-loop and closed-loop control unit 38 may be charged, by means of which an electric braking device 40, such as, in particular, a braking motor or the like, is controllable, which generates an effective braking force for damping the movement of the door leaf.

Herein, in this generative braking device 28 shown in FIG. 3, in order to generate the generator voltage according to the invention, the generator shaft 42 of the generator 30 is rotatable with the discharging of a mechanical generator energy storage device 44 specifically associated with the generator 30, which is charged by a respective opening movement of the door leaf and is mechanically decoupled from the door leaf or its axis of rotation during a respective closing movement of the door leaf and discharges in the state mechanically decoupled from the door leaf or its axis of rotation.

Herein, during a respective opening movement of the door leaf, by means of which the mechanical generator energy storage device 44 is charged, the mechanical generator energy storage device 44 may be mechanically coupled with the door or its axis of rotation, for example, by means of a generator driver 46, which, during a respective closing movement of the door leaf, during which the mechanical generator energy storage device 44 discharges, is mechanically decoupled from the door leaf or its axis of rotation.

As can be seen from FIG. 3, the generator shaft 42 of the generator 30 may be rotatable with a respective discharging of the mechanical generator energy storage device 44 by means of a generator gear unit 48 which is specifically associated with the generator 30.

The charging circuit 36 may be associated with a protective diode 50, which prevents a voltage from being applied to the charging circuit 36 during a respective opening movement of the leaf, by means of which the mechanical generator energy storage 44 device is charged.

Alternatively, or in addition to, the protective diode 50, the generator 30 or the generator gear 48 may also be preceded by a one-way overrunning clutch, which prevents a voltage from being applied to the charging circuit 36 during a respective opening movement of the door leaf, by means of which the mechanical generator energy storage device 44 is charged.

In the present embodiment according to FIG. 3, the door leaf concerned is associated with a door closer 52, having a rotatable door closer axis 56, which is coupleable to the door leaf concerned and cooperates with a mechanical door closer energy storage device 54, and a braking device 28 according to the invention, as described above with reference to FIG. 3.

As can be seen from FIG. 3, in the present exemplary embodiment, a door closer driver 58 coupled with the door closer axle 56 or a door closer gear unit 34 associated therewith cooperates with the generator driver 46 such that it entrains the generator driver 46 during the opening movement of the door leaf, by means of which the mechanical generator energy storage device 44 is charged, whereas during a respective closing movement of the door leaf, during which the generator energy storage device 44 discharges, it is decoupled from the respective generator driver 46.

Here, the mechanical generator energy storage device 44 may be dimensioned smaller than the mechanical door closer energy storage device 54, which are two separate mechanical energy storage devices.

In addition, the generator 30 and the generator gear unit 48 associated therewith may be designed such that the discharging of the mechanical generator energy storage device 44 or the relaxing of the generator spring unit, forming this mechanical generator energy storage device 44, is damped at least strongly enough that the generator driver 46 runs behind the door closer driver 58.

The mechanical decoupling of the generator 30 according to the invention ensures in a simple and correspondingly cost-effective manner that the generator supplies an at least substantially constant voltage, independent of the speed and direction of rotation of the door leaf, and that the charging circuit 36 can be accordingly designed for a smaller voltage range.

Figure 4:
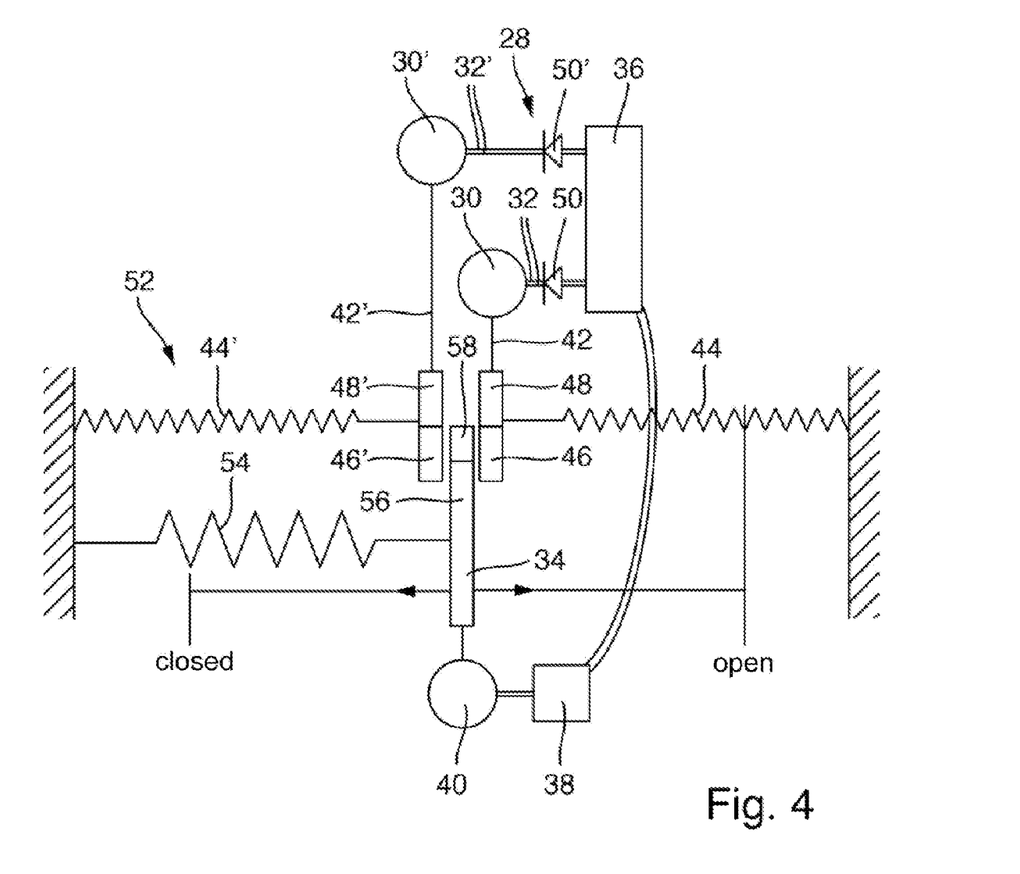
FIG. 4 shows a schematic representation of another exemplary embodiment of a generative braking device according to the invention, having two generators for charging the charging circuit during both, a respective closing movement and a respective opening movement of the door leaf.

FIG. 4 shows a schematic representation of another exemplary embodiment of a generative braking device 28 according to the invention, having two generators 30, 30' for charging the charging circuit 36 during both, a respective closing movement and a respective opening movement of the door leaf. In the present case, the generative braking device 28 is again provided in conjunction with a door closer 52, having a rotatable door closer axle 56, coupleable with door leaf, cooperating with a mechanical door closer energy storage device 54, a door closer gear unit 34, and a door closer driver 58. In this case, this generative braking device according to FIG. 4 comprises two generators 30, 30' for charging the charging circuit 36. The generator shaft 42 of the first generator 30 is rotatable to generate a generator voltage with the discharging of the first mechanical generator energy storage device 44 specifically associated with this first generator 30, which is charged by a respective opening movement of the door leaf and is mechanically decoupled from the door leaf or its axis of rotation during a respective closing movement of the door leaf and discharges in the state mechanically decoupled from the door leaf or its axis of rotation. In this case, the first generator 30 may be associated, for example, with a generator driver 46, cooperating with a door closer driver 58, as well as with a generator gear unit 48, as described above with reference to FIG. 3.

In contrast, the generator shaft 42' of the second generator 30' is rotatable to generate a generator voltage with the discharging of a second mechanical generator energy storage device 44' specifically associated with this second generator 30', which is charged by a respective closing movement of the door leaf and is mechanically decoupled from the door leaf or its axis of rotation during a respective opening movement of the door leaf and discharges in the state mechanically decoupled from the door leaf or its axis of rotation.

The second generator 30' may again be assigned a generator gear unit 48' as well as a generator driver 46' cooperating with the door closer driver 58' in the manner described above.

In this case, during a respective closing or opening movement of the door leaf, by means of which the first and the second mechanical generator energy storage device 44 and 44' are charged, both the first and the second mechanical generator energy storage device may be mechanically coupled with the door or its axis of rotation, via the door closer axis 56, by means of a first and a separate second generator driver 46 or 46', which, during a respective closing or opening or closing movement of the door leaf, during which the respective mechanical generator energy storage device 44 or 44' discharges, is mechanically decoupled from the door leaf or its axis of rotation.

The generator shaft 42 or 42' of the first and second generators 30 and 30' in the present case are each rotatable with the discharging of the first and second mechanical generator energy storage device 44 and 44' by means of the first and second generator gear unit 48 and 48' specifically associated with the first or second generator 30 and 30', respectively.

In the present case, between the charging circuit 36 and the first generator 30 and between the charging circuit 36 and the second generator 30', a protective diode 50 or 50' is again provided, which prevents a voltage from being applied to the charging circuit 36 during a respective opening or closing movement of the door leaf, by means of which the first or second mechanical generator energy storage device 44 or 44', respectively, is charged.

Alternatively or additionally to the respective protective diode, the first and second generator 30 and 30' or the first and second generator gear unit 48 or 48', respectively, may each again be preceded by a one-way overrunning clutch, which prevents a voltage from being applied to the charging circuit 36 during a respective opening or closing movement of the door leaf, by means of which the first or second mechanical generator energy storage device 44 or 44', respectively, is charged.

A respective mechanical generator energy storage device 44, 44' may in particular comprise a generator spring unit. As stated, the mechanical door closer energy storage device 54 may in particular comprise a door closer spring unit.

Figure 5:
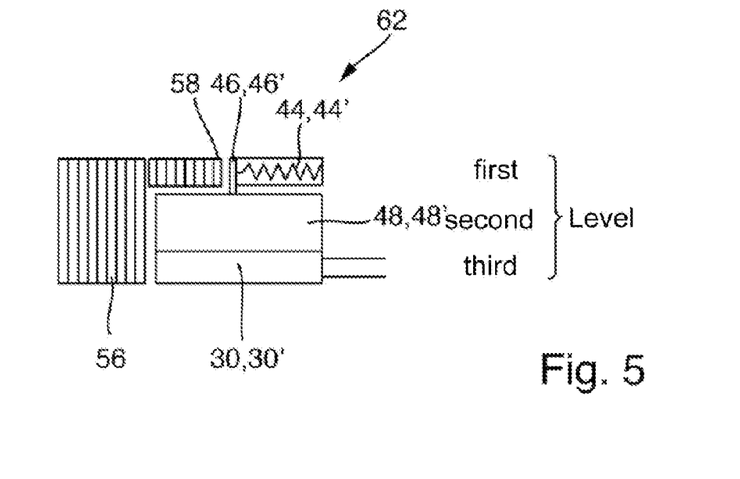
FIG. 5 shows a schematic representation of the various levels of another exemplary embodiment of a generative braking device according to the invention, which is embodied in the form of a module.
Figure 6:
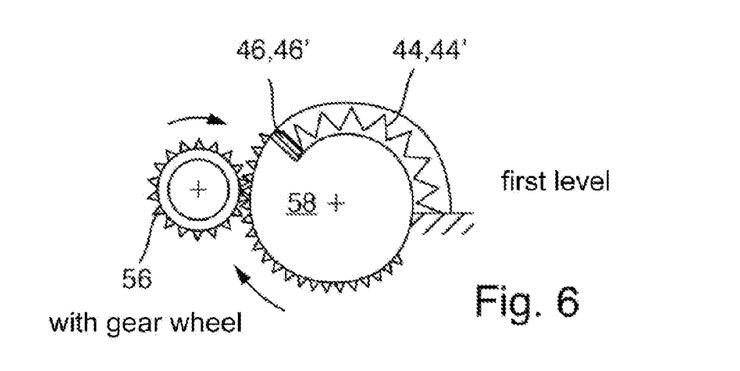
FIG. 6 shows a schematic representation of a first level of the braking device module of FIG. 5, comprising a generator driver and a generator energy storage device, having, for example, a generator spring unit.
Figure 7:
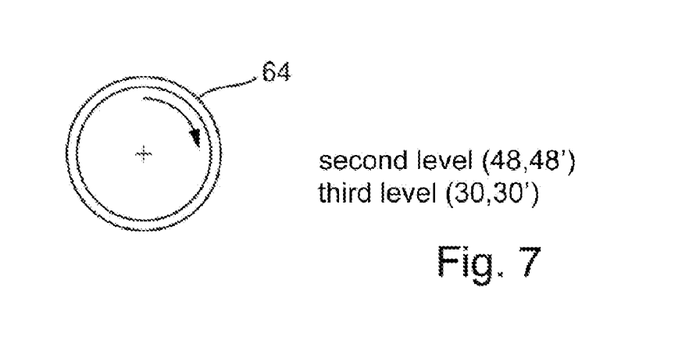
FIG. 7 shows a schematic illustration of the second level, comprising a generator gear unit, and the third level, comprising a generator, of the braking device module according to FIG. 5.

As shown in FIGS. 5 to 7, a respective generative braking device 28 according to the invention may be embodied, for example, as a module 62, having with a housing 64, particular a closed housing, and at least one generator 30, 30', at least one mechanical generator energy storage device 44, 44', and particularly, at least one generator gear unit 48, 48' and/or at least one generator driver 46, 46'.

Herein, FIG. 5 shows the various levels of such a braking device module 62, having at least one mechanical generator energy storage device 44, 44' and at least one generator driver 46, 46' in the first level, at least one generator gear unit 48, 48' in the second level, and at least one generator 30, 30' in the third level. In addition, in FIG. 5 also shows the door closer axis 56 as well as the door closer driver 58, cooperating with a respective generator driver 46, 46'.

FIG. 6 shows the first level of the braking device module 62, comprising at least one mechanical generator energy storage device 44, 44' and the at least one generator driver 46, 46', while FIG. 7 represents the housing 64, in particular the closed housing, with the second level, comprising the at least one generator gear unit 48, 48', and third level of the braking device module 62 comprising the at least one generator 30, 30'.

LIST OF REFERENCE SYMBOLS

10 Conventional braking device
12 Mechanical door closer energy storage device
14 Door closer axis of rotation
16 Door closer gear unit
18 Braking motor
20 Regulating and/or control unit
22 Charging circuit
24 Generator
26 Generator shaft
28 Braking device according to the invention
30 Generator
30' Generator
32 Output terminals
32' Output terminals
34 Door closer gear unit
36 Charging circuit
38 Open-loop and/or closed-loop control unit
40 Electric braking device, braking motor
42 Generator shaft
42' Generator shaft
44 Mechanical generator energy storage device
44' Mechanical generator energy storage device
45 Generator driver
46' Generator driver
48 Generator gear unit
48' Generator gear unit
50 Protective diode
50' Protective diode
52 Door closer
54 Mechanical door closer energy storage device
56 Door closer axis
58 Door closer driver
62 Module
64 Housing

The invention claimed is:

1. A braking device (28) for a movable door leaf, having a first generator (30) with first terminals (32) and a second generator (30') with second terminals (32') configured to generate, at the output terminals (32) of which, a generator voltage to charge a charging circuit (36) for supplying an open-loop and closed-loop control unit (38), the control unit configured to control an electric braking device (40), comprising a braking motor, the electric braking device configured to generate an effective braking force for damping the movement of the door leaf, wherein the first generator (30) includes a first generator shaft (42), which is rotatable for generating the generator voltage with the discharging of a first generator energy storage device (44), corresponding to the first generator (30), which is charged by a respective opening movement of the door and is mechanically decoupled from an axis of rotation of the door during a respective closing movement of the door, and discharges in the state mechanically decoupled from the door leaf or the axis of rotation of the door leaf, and a second generator shaft (42') of a second generator (30') is rotatable for generating a generator voltage with the discharging of a second generator energy storage device (44'), corresponding to the second generator (30'), which is charged by a respective closing movement of the door and is mechanically decoupled from the axis of rotation of the door during a respective opening movement of the door, and discharges in the state mechanically decoupled from the door leaf or the axis of rotation of the door leaf.

2. The braking device according to claim 1,
wherein, during a respective closing or opening movement of the door leaf to charge the first and the second mechanical generator energy storage device (44 and 44'), both the first and the second mechanical generator energy storage devices may be mechanically coupled with the door or the axis of rotation of the door using a first and a separate second generator driver (46 and 46'), which is mechanically decoupled from the door leaf or the axis of rotation of the door leaf, during a respective closing or opening or closing movement of the door leaf, which discharges the respective mechanical generator energy storage device (44 or 44').

3. The braking device according to claim 1,
wherein the first or second generator shaft (42 or 42') of the first and second generators (30 and 30') are each rotatable with the discharging of the first and second mechanical generator energy storage device (44 and 44') by the first and second generator gear unit (48 and 48') corresponding to the first or second generator (30 and 30'), respectively.

4. The braking device according to claim 1,
wherein, between the charging circuit (36) and the first generator (30) and between the charging circuit (36) and the second generator (30'), a protective diode (50 or 50') is provided to prevent a voltage from being applied to the charging circuit (36) during a respective opening or closing movement of the door leaf, which charges the first or second mechanical generator energy storage device (44 or 44'), respectively.

5. The braking device according to claim 1,
wherein the first and second generator (30 and 30') or the first and second generator gear unit (48 or 48'), respectively, prevents a voltage from being applied to the charging circuit during a respective opening or closing movement of the door leaf, which charges the first or second mechanical generator energy storage device (44 or 44'), respectively.

6. The braking device according to claim 1,
wherein a respective mechanical generator energy storage device (44, 44') comprises a generator spring unit.

7. The braking device according to claim 1 comprising a module (62) which includes, the at least one generator (30, 30') and the at least one mechanical generator energy storage device (44, 44') where the module (62) is enclosed in a housing (64).

8. The braking device according to claim 7,
wherein the module also includes the at least one generator gear unit (48, 48') or the at least one generator driver (46, 46').

9. A door closer (52) having a rotatable door closer axis (56), coupleable with a door leaf, cooperating with a mechanical door closer energy storage device (54), and a braking device (28), wherein the braking device (28) is designed in accordance with claim 1.

10. The door closer according to claim 9,
wherein a door closer driver (58) coupled with the door closer axis (56) cooperates with a respective generator driver (46) to entrain the respective generator driver (46) during a respective opening or closing movement of the door leaf, which charges the mechanical generator energy storage device (44), wherein the door closer driver (58) is decoupled from the respective generator driver (44) during a respective closing or opening movement of the door leaf, during which the mechanical generator energy storage device (46) concerned discharges.

11. The door closer according to claim 9,
wherein a respective mechanical generator energy storage device (44) is dimensioned smaller than the mechanical door closer energy storage device (54).

12. The door closer according to claim 10,
wherein a respective generator (30) and corresponding generator gear unit (48) are configured to discharge the corresponding mechanical generator energy storage device (44) or the relaxing of the corresponding generator spring unit is damped such that the corresponding generator driver (46) runs behind the door closer driver (58).

* * * * *